S. B. KING.
Apparatus for Burning Fuel.
No. 225,223.  Patented Mar. 9, 1880.
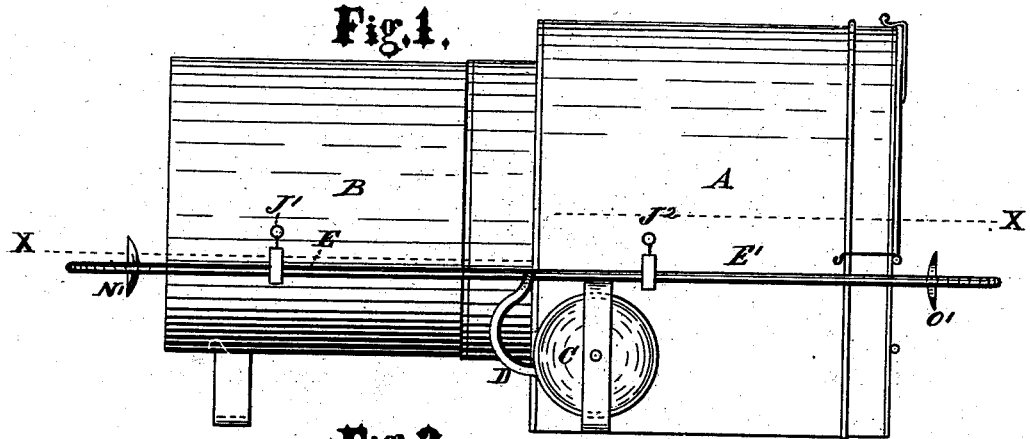
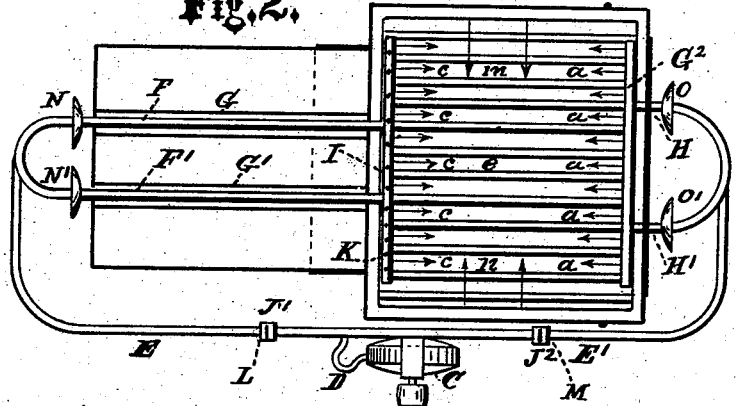
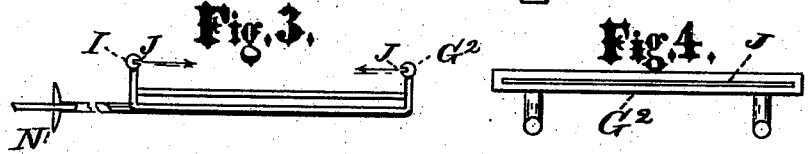 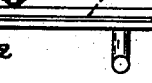
Witnesses.
Amos W Sangster
Edward Hurley
Inventor.
Sidney B. King.
By James Sangster

UNITED STATES PATENT OFFICE.

SIDNEY B. KING, OF BUFFALO, NEW YORK, ASSIGNOR TO HIMSELF, JAMES S. STYGALL, JR., AND EDWARD HURLEY, OF SAME PLACE.

APPARATUS FOR BURNING FUEL.

SPECIFICATION forming part of Letters Patent No. 225,223, dated March 9, 1880.

Application filed November 15, 1879.

*To all whom it may concern:*

Be it known that I, SIDNEY B. KING, a citizen of the United States, residing in the city of Buffalo, in the county of Erie and State of New York, have invented certain new and useful Improvements in an Apparatus for Burning Fuel, which improvements are fully set forth in the following specification and accompanying drawings, in which—

Figure 1 is a side elevation; Fig. 2, a horizontal section through line X X, Fig. 1. Fig. 3 represents a detached view, showing a side elevation of the air-blast tubes as arranged inside of the furnace, also a detached portion of one of the outer tubes in section; and Fig. 4 is a front view of one of the air-blast tubes from which the air is forced to the fire.

The object of my invention is to produce a more perfect combustion, and thereby effect a saving in fuel, by preventing the escape of a large portion of the unconsumed carbon in the form of dense volumes of smoke. The object of the invention is also to avoid the very serious objection to the escape of so much carbon or smoke; and it consists, first, of a suitable air-forcing apparatus connected to a series of air-tubes within the furnace arranged either above or below the fire-grate so as to become heated, in combination with two or more air-blast tubes having either a line of perforations or a long narrow opening on one side for the escape of the air, and arranged so that their openings will be opposite each other, so that the several air-blasts may be forced toward each other, or toward a common center, and thereby supply sufficient oxygen, without interfering with the natural draft, to combine with the unconsumed carbon and carbureted-hydrogen gas, so as to form a more perfect combustion, as will be more clearly hereinafter shown; second, the combination of two or more air-blast tubes, as above specified, arranged so that their openings are opposite each other within the furnace, above the fuel, and a series of air-tubes arranged above or below the fire-grate and provided with one or more inlet air-tubes having a bell-shaped mouth, for the purpose of supplying the air used above the grate-bars when the natural draft is sufficient for the purpose; third, a series of air-blast tubes, substantially as above described, in combination with one or more valves or stop-cocks for the purpose of regulating the quantity of air passing from any or all of the air-blast tubes; fourth, the arrangement of the tubes for conducting heated air to the air-blast tubes, in combination with a suitable air-forcing device, as will more clearly hereinafter appear.

In the accompanying drawings, in which my invention is shown as applied to an ordinary tubular boiler, A represents the front part of the boiler, and B the rear portion of the same. C is a rotary air-forcing device. Any other air-forcing mechanism or pump may be used. D is the tube through which the air is forced by the fan or rotary blower C to the tubes E E', one portion of which passes through the tube E to the rear of the boiler, and from thence forward through the flues F F', arranged in the boiler-flues G G', and then along the grate *e*, either above or below, to the front air-blast pipe, $G^2$, from which the air issues in the direction of the arrows *a*. The other portion passes along through the pipe E' to the front, and from thence, through the pipes H H', to the rear air-blast pipe, I, and out in the direction of the arrows *c*.

If desired, the air-pipes may be arranged on the sides of the furnace, so as to force air in the direction of the arrows *m n*.

The air issues from the air-blast tubes through openings J. (See Figs. 3 and 4.)

J' $J^2$ represent two valves for regulating the amount of air admitted to the front or rear air-blast tubes.

If desired, the rear air-blast tube, I, may be perforated on top, as at K, so as to throw a blast of air upward for the purpose of furnishing oxygen to meet any unconsumed carbon that might pass into the boiler-flue.

N N' represent the mouth-pieces on the tubes F F', and *o o'* the mouth-pieces on the tubes H H'.

The tubes E E' are made removable at or about the points L M, so that the apparatus can be used without the blower when the natural draft is sufficient for the purpose; but I think the operation is more perfect with a forced draft.

I claim as my invention—

Two or more air-blast tubes, $G^2$ I, arranged within the furnace above the fire-grate and having their openings facing or opposite each other, as specified, in combination with the flues F F', tubes H H', and an air-forcing device connected by suitable tubes, all as and for the purposes described.

SIDNEY B. KING.

Witnesses:
  JAMES SANGSTER,
  EDWARD HURLEY.